Feb. 14, 1961 G. DIRKS 2,971,626
JUSTIFYING APPARATUS FOR POWER OPERATED TYPEWRITERS
Filed May 5, 1958

INVENTOR
Gerhard Dirks
BY Michael S. Striker
ATTORNEY

Feb. 14, 1961    G. DIRKS    2,971,626
JUSTIFYING APPARATUS FOR POWER OPERATED TYPEWRITERS
Filed May 5, 1958    7 Sheets-Sheet 3

INVENTOR
Gerhard Dirks
BY Michael S. Striker
ATTORNEY

United States Patent Office 2,971,626
Patented Feb. 14, 1961

2,971,626

JUSTIFYING APPARATUS FOR POWER
OPERATED TYPEWRITERS

Gerhard Dirks, Morfelder Landstrasse 44,
Frankfurt am Main, Germany

Filed May 5, 1958, Ser. No. 732,892

Claims priority, application Germany Oct. 1, 1948

11 Claims. (Cl. 197—84)

The present invention relates to power operated typewriters and composing machines in which a line of characters is progressively recorded character after character.

An object of the invention is to effect justification in a character by character recorder of data organized into lines varying between predetermined limits into justified lines by selection of electrical frequency generators.

A further object of the invention is to effect this selection under control of contacts denoting carriage positions operated in the course of this initial typing.

Another object is to effect this frequency selection under control of a counter. According to this invention a first typewriter has carriage position contacts connected to select a motor drive speed appropriate to the time typed so as to effect justification when retyped under spacing regulated by said motor, the motor speed being governed by the selected one of a plurality of frequency generators.

The invention is of quite general application and it is to be understood the typewriter shown herein is selected for purpose of illustration only and should not be considered restrictive.

The invention will now be described as applied to justified typing of manually typed data intermediately stored magnetically.

In order that the present invention may be readily carried into effect, it will now be described with reference to the accompanying drawings, wherein.

The invention will be described in two stages, the first stage being the initial typing and recording and the second stage being the read-out from the recording to effect justified typing. The initial typewriter is shown fitted with an automatic carriage return circuit which constitutes the subject matter of copending patent application, Serial No. 732,961, filed May 5, 1958.

Figure 1:
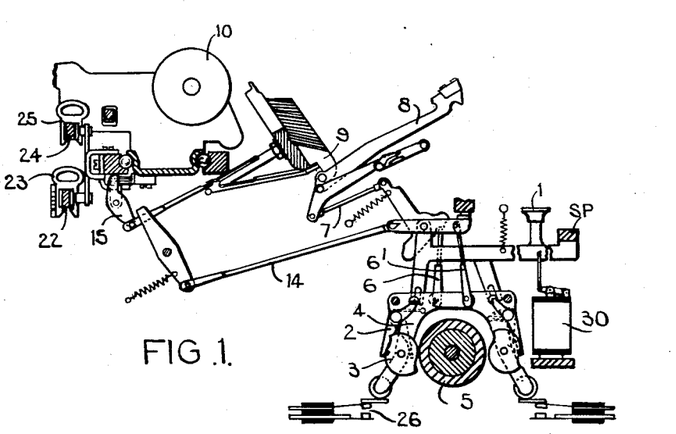
Figure 1 is a side view, partly in section, of a typewriter of known kind.

Figure 1 is a side view of a well known power operated typewriter of the general construction shown in United States Patents Nos. 1,777,055, 1,873,512 and 1,955,614, and particularly in United States Patent No. 2,318,291.

Figure 2:
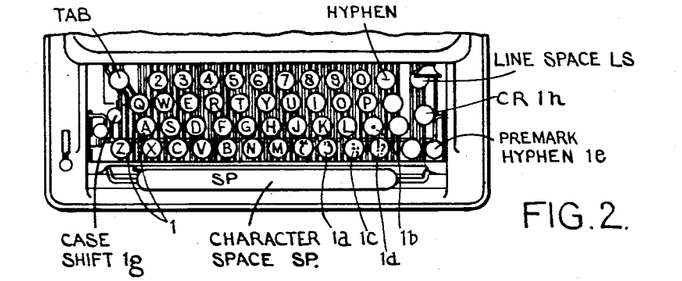
Figure 2 shows the keyboard of the typewriter of Fig. 1.

The general mode of operation is as follows:

The typewriter (Figure 1) and keyboard (Figure 2) may be operated manually by depression of any of the keys 1 (Figures 1 and 2). It will be assumed for the purpose of the example that the standard line length required comprises 60 character spaces and is not to exceed 70. The keyboard is generally a standard keyboard with usual layout and keys for functions such as carriage return 1h and case shift 1g.

Keys for the expression marks utilized in the invention are however provided with pairs of expression marks allocated for upper and lower case as follows:

Key 1a for close of brackets, and comma, key 1b for full stop, key 1c for colon and semi-colon, key 1d for exclamation mark and question mark. Unconventionally an additional non-standard key 1e is also provided for premark hyphen as hereinafter explained.

Figure 4:
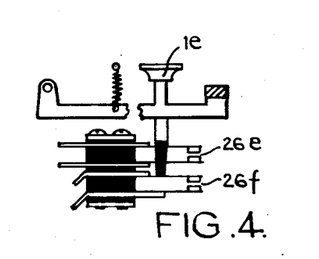
Figure 4 is a side view of a pre-mark hyphen key.

Depression of any of the printing keys 1 (except 1e) (the keys are mounted on cross bars supported in the frame) releases a latch 2 from a cam 3 permitting a spring pressed lever to move the cam 3 against the periphery of a continuously driven roller 5. The cam 3 is rotated by contact with the roller 5 causing the lever 4 to rock in a direction for depressing a link 6. The link 6, through linkage 7, propels the type bar 8 carried by the basket 9 towards the platen 10 to effect printing of the type denoted by the key depressed. One key, however, namely the premark hyphen key 1e shown in Figure 4, is not of the standard pattern. The key 1e operates only electrical contacts 26e and 26f. These are connected as explained below to operate a solenoid 30 associated with the hyphen key under the special conditions that the carriage is in the "excess line" position. Solenoids 30, one for each of the various keys to be operated, are provided whether keys for a functional operation or for printing a selected type. Thus, solenoid 30 of the carriage return will be referred to as 30CR and that of the space bar as 30SP. Depression of a space bar SP similarly to the effect of actuation of any of keys 1 results in a downward movement of the link 6¹ to operate linkage 14 to actuate the escapement lever 15 to effect a carriage or letter spacing movement.

Figure 3:
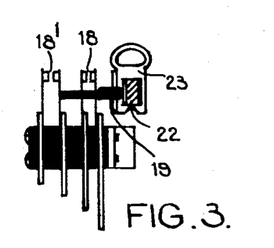
Figure 3 is a side view of the standard line length contact and the rack with tab stop for operating the contact.

The tabulating mechanism operated by the key TAB includes the usual settable tabular stops 25 fixed at selected positions on a rack 24 to determine columnar starting positions. The typewriter carriage is also fitted with a line end stop 23 on a rack 22. The position of the line end stop 23 is indicative of a selected column set as standard line length. The outward projection on stop 23 controls a non-conductive member 19 to close contacts 18 and 18¹ (Fig. 3) when the carriage is in the standard line length column position, that is, column 60.

The typewriter has the usual pair of pawls to effect escapement, with the spring carriage drive described in United States Patent No. 1,873,512. The line spacing key LS advances a ratchet. This ratchet is also operated by the action of the carriage return key 1h. The keys, except 1e, are also fitted with contacts 26 closed by levers 4 moved by operation of the keys. The contacts of certain keys are double contacts. One set of contacts is available for reading out data for recording in preparation for justification, and where these are doubled the other contact is used for also operating solenoids as further shown in the circuit of Figure 4.

At the outset, the typist prepares merely partly justified copy, within for example a standard line length of 60 characters and a maximum excess of 10 further characters, for this purpose a standard line length stop 23 is inserted in column 60. For words in excess of 9 characters the premark hyphen key is used by the operator to hyphen sensibly.

Depression of this premark hyphen key has no result save when the carriage is in the excess line position.

Upon the closing of standard line contact 18 (Figure 5) a relay 27 is operated. The relay 27 holds on by its hold winding 28 and its own contact 27a and normally closed contact 29a. The relay 27 has three further contacts 27b, 27c and 27d for preparing circuits for ending the line by operation of the carriage return key by means of the solenoid 30CR.

Figure 5:
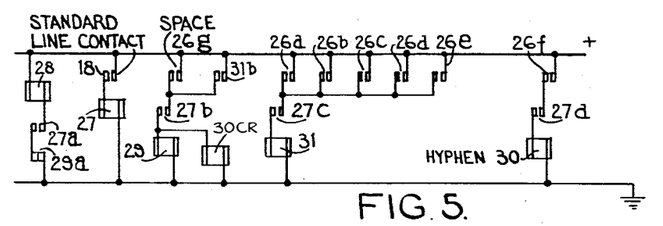
Figure 5 is a schematic circuit diagram of an embodiment of a circuit for controlling the line end.

As long as characters of a word are keyed the normal operation continues, but on terminating a word by a space, a circuit is completed by the space key contact 26g through now closed contact 27b to operate solenoid 30CR of the carriage return key and to operate relay 29 wired in parallel (slow acting). Operation of relay 29 results in opening its normally closed contact 29a thus releasing the hold so far effected by winding 28 of relay 27.

On terminating a word concluding with an expression mark (keys 1a–e) the second contacts 26a–e associated with these keys close. A circuit is then completed via relay 31 and now closed contact 27c. Relay 31 is slow acting to allow time for printing. Hence, the carriage return solenoid 30CR is energized through relay contact 31b and slow acting relay 29 energized in parallel. The relay 29 has a contact 29a normally closed which is now opened to release the hold so far effected by winding 28 of relay 27 after carriage return thus has been effected at a point within the standard line length. The previous closing of contact 27d allows the depression of the premark hyphen key 1e to operate by its contact 26f and now closed contact 27d, the hyphen key solenoid 30 effecting normal hyphenating. The simultaneous closing of contact 26e has the carriage returning effect as described above.

With the above arrangement therefore if the typist uses the premark hyphen key 1e to hyphen words exceeding by 9 characters the line limit of 60 characters the line will never extend beyond 69 character spaces. Furthermore, each line will terminate at a word end or an expression mark or at a hyphen. This constitutes the subject matter of copending patent application Serial No. 732,961, filed May 5, 1958.

The data so printed are desired to be placed in justified form. This is effected by reading out character by character in code form to storage, and then reading back from this storage to operate a second justified typewriter. The spacing for this second typewriter is selected by reference to the position at which the carriage return was automatically selected during the initial typing. Because this falls within closely determined limits this may be directly effected, without undue equipment.

For performing the above read-out the first contacts 26 of the initial typewriter keys, including those of the expression mark keys, are connected to a code translator of a form known per se.

Figure 6:
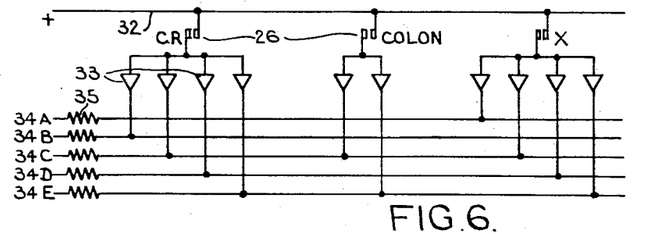
Figure 6 is a schematic circuit diagram of a code converting circuit of known kind.

These contacts 26 (Figure 6) are wired from positive line 32 via rectifiers 33 selectively to resistors 35 of 5 code wires 34A, B, C, D, E, so as to connect each contact to its particular code combination. Figure 6 shows contacts for keys representing carriage return, colon or semi-colon, and letter X, respectively, connected to select code combinations respectively, BCDE, CE, ACDE. For simplicity this has been shown limited to 5 point code. In practice, a code involving 6, 7 or 8 points would be more suitable, as in the justification to be described only one code combination is selected at a time so that as described the extra combinations required for case shift would not be available. That is, every character must have its own unique code for its selection, as also space and carriage return.

Figure 13:
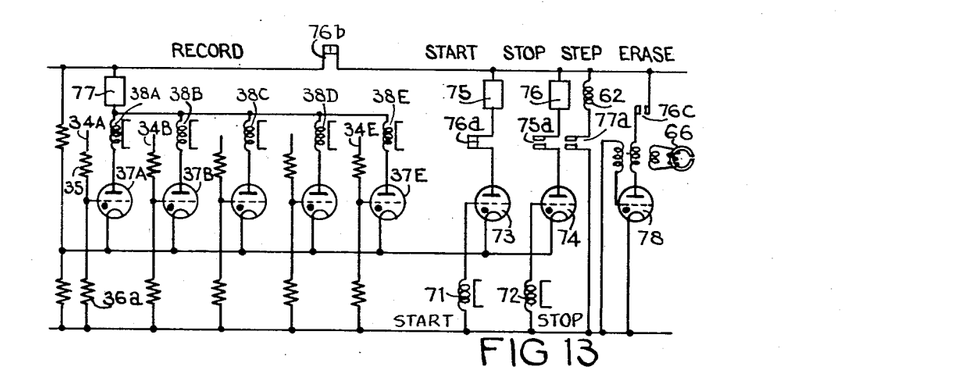
Figures 13 and 14 are schematic circuit diagrams of embodiments of circuits operated by the read-in distributor for recording and erasing characters.

It will be readily apparent how the illustrated equipment may be extended for any required code appropriate to the final printer. As illustrated by Fig. 13, the code line 34A is connected via a resistor 35 to a grid of a cold cathode discharge tube 37A, the grid being negatively biased by a resistor 36a. The anode of the tube 37A is connected to an inductive distributor coil 38A and similar circuits are provided for each of the other code lines. The distributor coils 38A to E are connected on their other side in common to a relay 77 in series with a normally closed contact 76b to the positive line.

Figure 9:
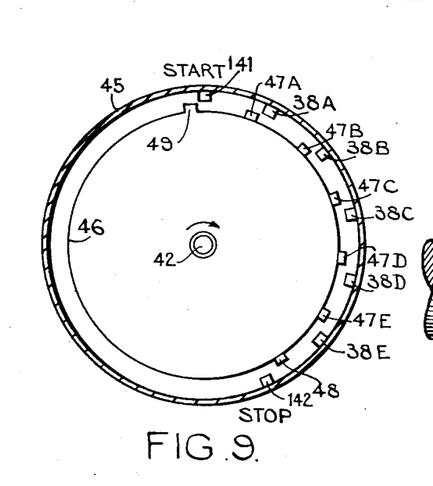
Figure 9 is a sectional view, taken on line BB of Figure 7, of the read-in distributor.

Upon receipt of a positive impulse on any of the lines 34A to E, the associated gas discharge tubes 37A to E (Figure 13), conduct to produce a current in the associated windings 38A to E (Figures 9, 10) to energize the associated distributor cores 56. The gas tubes 37A to E are extinguished by the opening of normally closed contact 76b of relay 76 (Fig. 13) after recording has been effected as hereinafter described.

The recorder (Figure 7) shown in elevation partially sectioned comprises a continuously rotating magnetic drum 41 mounted on a shaft 42 rotated by a motor 43 so as to make at least one revolution for each code entry. The shaft is supported in frame members 44. Also mounted on the shaft 42 are input distributors 46—52, output distributors 46²—52², frequency generators 100—110 and sets of slip rings 64 and 64². The input distributor comprises the cup member 45 (Figs. 8–10) which may be moved stepwise by a solenoid operated ratchet mechanism relatively to the drum 41. The cup member 45 (Figure 9) carries the inductively coupled input coils 38A–E and output coils 46A to E on respectively common cores 56 and a start recording coil 141 and stop recording coil 142. The coils are each wound on cores 56 fastened to the inside of the cup member 45 and positioned to cooperate respectively with the magnetic yokes of wheels 46 to 52 rotating with shaft 42.

For each core 56 (Figures 9 and 10) is provided a different wheel carrying an inductive yoke. Wheel 46 carries yoke 49 for traversing the core of start recording coil 141, five wheels 47—51 carry respectively yokes 47A to E each for traversing one of the respective cores 56 of the input coils 38A to E, and wheel 52 carries yoke 48 for traversing a core of the stop recording coil 142. A similar character read-out distributor is formed by the corresponding members 46² to 52² and 45².

Figure 10:
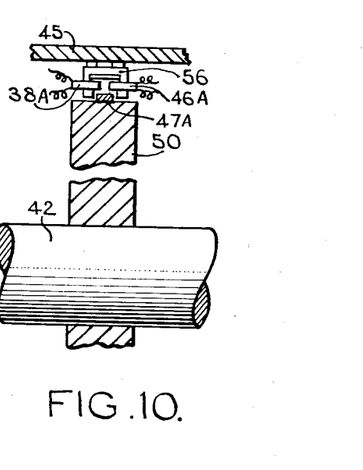
Figure 10 is a front view, partly in section, of a distributor element and core.
Figure 14:
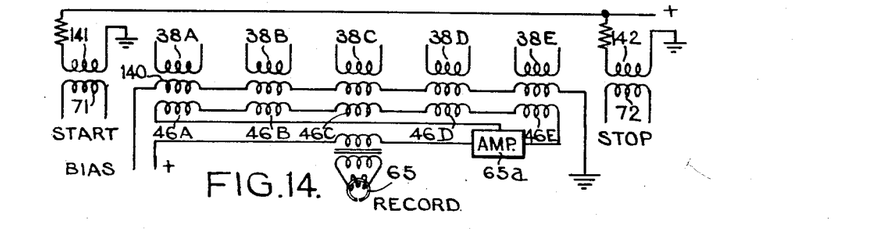

The core 56 and yoke 47A of wheel 47 are shown in further detail in Figure 10. The core 56 is fixed to cup member 45. Core 56 has three coils: input coil 38A, a bias coil 140 (Fig. 14, not shown in Fig. 10) and output coil 46A. The start and stop cores 141, 142 differ in having no bias winding, and in being continuously magnetized as coils 141 and 142 are connected to the active line (Figure 14).

The yokes are differentially disposed around the circumference of their respective wheels in relation to their cooperating cores 56 so that the start yoke 49, signal yokes 47A to E (Figure 9), and stop yoke 142, each traverse their respectively associated cores 56 in this sequence and during less than 1/100 of a revolution. Storage of a character code then occupies less than 3.6° with such a disposition, without cramping the physical angular distribution of the cores 56.

Figure 7:
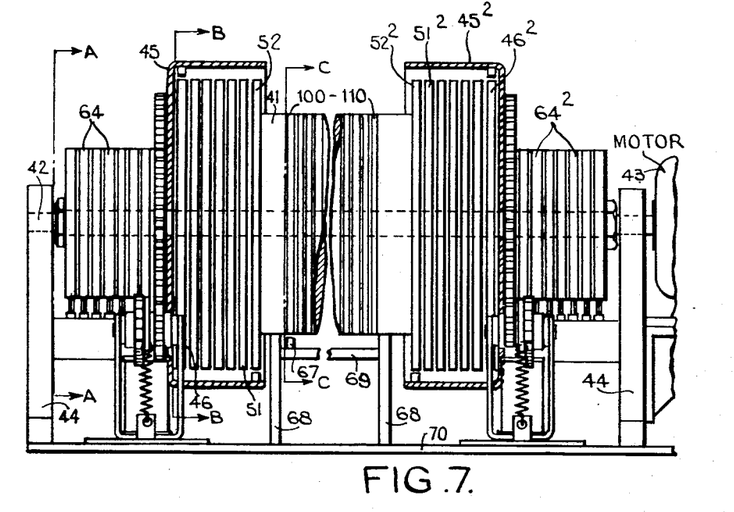
Figure 7 is an elevation, partly in section along the axis, of an embodiment of distributors, magnetic drum storage means and frequency generators.
Figure 8:
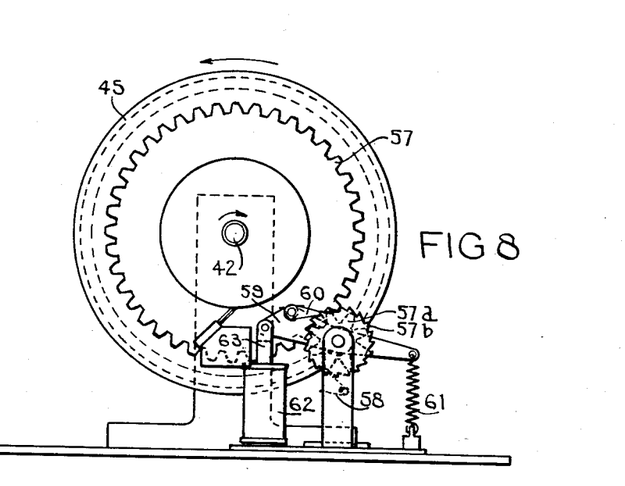
Figure 8 is a ratchet drive for stepping the read-in inductive distributor, viewed on line AA of Figure 7.

Figure 8 shows details of the drive for cup 45 as seen in direction AA of Figure 7. The arrow indicates the direction of rotation. The ratchet stepping mechanism (known per se) for stepping back the cup 45 relatively to the shaft 42 and hence to the storage drum 41, comprises a gear 57 loosely mounted on the shaft 42 and pinned to the cup 45. Meshing with this is a gear 57a pinned to a ratchet gear 57b. The stepping mechanism also includes a restraining spring 58 to prevent overthrow of cup 45, a lever 59 arranged to be freely turnable on the shaft carrying the gear 57a and to carry a pawl 60 spring biased for engagement with the ratchet gear 57b, a spring 61 attached to the end of the lever 59 remote from the pawl for furnishing stepping power and a solenoid 62 for retracting the pawl over the ratchet gear teeth by operating on the link 63 connected to the other end of the lever 59. Upon the energization of the solenoid 62 the pawl slides over the ratchet teeth and no change of cup member 45 occurs. Upon deenergization, however, rotation of member 45 occurs under control of spring 61 by the amount allocated for a unit of character storage, for example 3.6°, through rotation of the ratchet gear 57b and gears 57a, 57, and hence cup member 45.

Figures 11, 12:
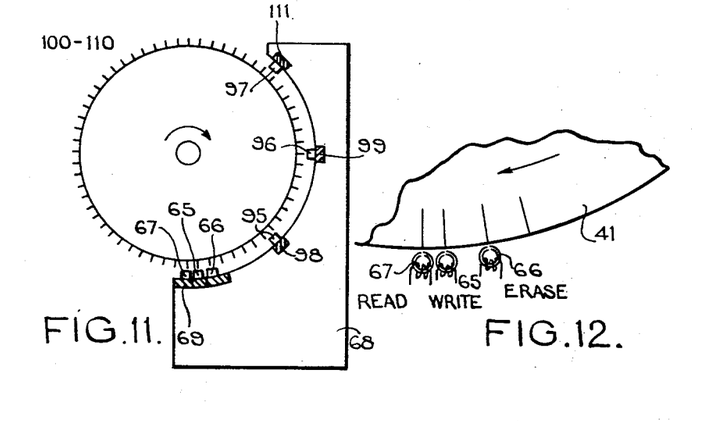
Figure 11 is a sectional view taken on the line CC of Figure 7 showing the magnetic storage drum and frequency generators.
Figure 12 is an enlarged portion of Figure 11 showing the read, write and erase heads cooperating with the magnetic drum.

As shown by Figs. 11, 12, a conventional recording head 65, erasing head 66 and read-out head 67 are supported on cross bars 69 mounted between a pair of arcuate frames 68 themselves supported on the base member 70 (Fig. 7). The erase head 66 is one character position away from the recording head 65 so that the next character space for the next entry is cleared in each revolution in which entry is made.

Returning now to Figures 13 and 14, it is seen that the code read-out from the key operated contacts energizes coils 38A to 38E appropriately to the code and at a time in the revolution governed by the traversal of the respective cores by their respective yokes a signal is delivered to the windings 46A–E (which are connected in series) to energize via amplifier 65a the fixed recording head 65.

This recording will take place within the times that the yokes couple start winding 141 to coil 71, and stop winding 142 to coil 72, and this occurs on the next position of the drum after each stepping back of the ratchet drive.

Coils 71 and 72 are connected in the grid circuits of cold cathode discharge tubes 73 and 74 (Figure 13) respectively. In the anode circuits are relays 75 and 76 having normally closed contacts 76a and normally open contacts 75a in the respective anode circuits.

When the tube 73 receives a start pulse, due to traversal of the start coil 141 by its yoke 49, it energizes operating relay 75 to close contact 75a. At the end of recording coil 72 receives a pulse which ignites the tube 74 and so energizes relay 76 to open the contacts 76a and extinguish the tube 73, which in turn releases relay 75 to thereby open contacts 75a and hence extinguish the tube 74.

The relay 76 is therefore only energized for a short while immediately after energization of stop coil 72. The relay 76 has a second contact 76b, normally closed, which effects the extinguishing of gas tubes 37A to E, and hence deenergization of relay 77.

The relay 77 is energized each time code signals operate any of the code gas tubes 37A to E. The relay 77 has a contact 77a to complete the circuit to the input distributor stepping solenoid 62 to advance the ratchet pawl 60. Upon deenergization of relay 77 due to the opening of contact 76b the solenoid 62 is deenergized and the cup member 45 is rotated under the influence of spring 61 by one character position in preparation for the next recording. Had no signal been received, relay 77 would not have operated and hence no stepping-on would have followed.

Erasure is effected by erasing head 66 having a high frequency applied during the period of recording by head 65 so as to erase any record in the area in which recording will be required in the next position.

Figure 15:
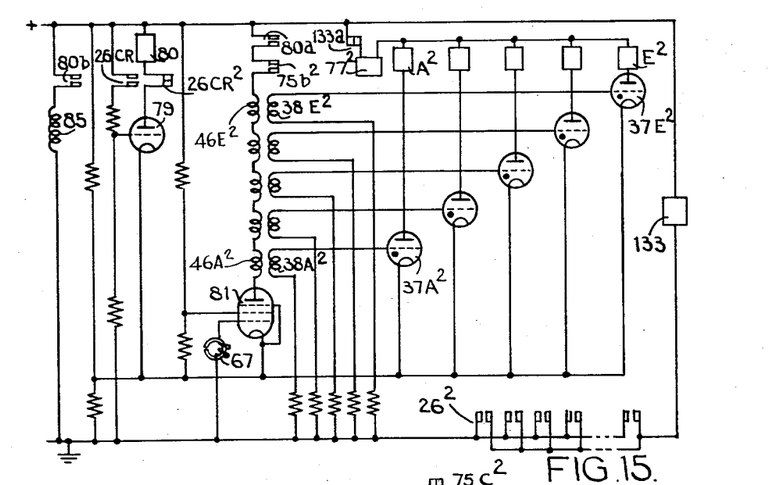
Figures 15 and 16 are schematic circuit diagrams of embodiments of circuits for read-out and decoding to operate the second typewriter (justifying)
Figure 16:
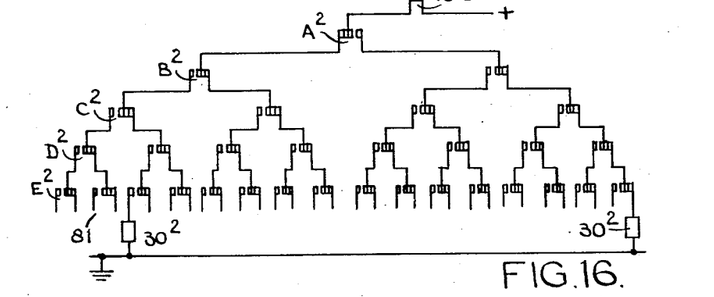

For this purpose, a high frequency oscillator tube 78 is provided having its grid and anode inductively coupled and contacts 76c of the stop relay 76 controlling its anode supply normally open. Contacts 76c close between energization of start and stop coils 71 and 72, respectively, that is, during actual recording. The general mode of operation is as follows:

The read-out of these recorded signals by signal head 67 (Figures 7, 12, 15) is effected in converse manner to read-in, so as to operate the keys of a second justifying typewriter generally similar to that employed for the initial typing save for the spacing mechanism and standard line length contact. It is not desired that the second typewriter start operating until a first line has been recorded and a signal received from the closing of a carriage return key contact 26CR indicating that carriage return has been called for on the first typing. Retyping from storage will then take place by read-out of one code character for each revolution of the magnetic drum storage 41 until the recorded carriage return signal of the first typing operates the carriage return key of the second typewriter. Spacing is controlled from frequency generators operating in synchronism with the drum and selected at the time of carriage return by the manually operated typewriter to produce a uniform spacing drive at the required speed to effect justification in the final typing. Cessation of signals and decoupling of the spacing drive then occurs when carriage return of the second typing occurs at line end, it being assumed that manual typing is slower than automatic typing. References to parts of the read-out distributor and the second typewriter similar to those of the input distributor and typewriter will be similarly numbered but referenced with suffix 2. The sensing and read-out circuit is shown in Figs. 15 and 16. A gas discharge tube 79 normally biased to cutoff has its grid connected to a positive voltage sufficient to cause it to ignite upon closure of a contact 26CR. This occurs when the first typewriter carriage return key is depressed manually, or automatically by operation of its associated solenoid 30CR under control of contact 27b of relay 27. The tube 79 remains conductive energizing interlock relay 80 until the normally closed contact 26CR² is opened by operation of the carriage return key of the second justifying typewriter.

The signal reading head 67 is connected to the grid of an amplifier tube 81. The anode circuit of amplifier tube 81 is connected to the serially connected distributor input coils 46A²—E² of the output distributor and thence to the positive line via normally open contacts 80a and 75b². Contact 80a is a contact of the interlock relay 80 and hence closed during typing. Contact 75b² is a normally open contact closed by the output distributor start relay 75² for the duration of each character sensing. The above mentioned distributor input coils are inductively coupled to the separate output coils 38A²—E². Each output coil is connected to operate a gas discharge tube 37A²—E² having a code relay A²—E² in its anode circuit respectively and jointly in series connection to the positive line via a normally closed contact 133a which is opened for each key operation and a signal detecting relay 77². This allows the relays A² to E² to stay energized until the selected key or keys are operated by their solenoids 30². Relay 133 is wired from positive line via normally open contacts 26² of the keys of the justifying typewriter in series as shown. The cup member 45² of the output distributor is stepped by a ratchet mechanism in a manner and direction similar to that of member 45 by start and stop coils associated with the output distributor operating a ratchet drive solenoid controlled by contacts 77a², all similar to what is shown in Fig. 13 but without the erasure circuit.

The decode relays A² to E² have contacts wired in tree form (Fig. 16) from the positive line via normally closed contacts 75c² with their outputs 81 representing the different combinations according to their code setting. These outputs are connected to operate the solenoids 30² for each key (one of which is shown). The opening of normally closed contacts 75c² occurs during set up of the code relays so avoiding spurious energization of solenoids during the change of setting of the decoding contacts. The contacts 26² are all wired in parallel so that closure of any one of said contacts operates the relay 133 having normally closed contacts 133a which open to extinguish read-out core tubes 37A²—E² upon energization, and hence acceptance of the code signal by a solenoid. This opening of contact 133a also resets the code tubes 37A²—E² by removing their anode voltage.

The second typewriter is desired to respace the line in accord with the extent to which the first manually typed line exceeded the standard length. The actual justified length may be any preset length. The general principle employed for spacing is that a frequency generator is selected under control of the excess line contact of the first typing to advance the carriage at a uniform rate dependent on the frequency selected for each line.

Figure 17:
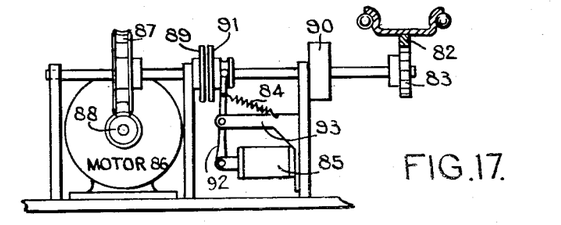
Figure 17 is a side view of the carriage drive for the justifying typewriter.

The required modifications to the carriage drive are shown in Figure 17. The normal escapement pawl is removed and in lieu thereof a rack 82 is attached to the underside of the carriage. This rack is driven by a motor 86 through worm wheel 88 and meshing gear 87 and disc friction clutch 89 and 91 (controlled by solenoid 85) and gear wheel 83 engaging with the rack 82. Carriage return is effected by a coil return spring 90 when the clutch is disengaged. The clutch solenoid 85 (Fig. 15) is controlled by the normally open contact 80b of relay 80 and hence closed for the start of a line and opened at the end as previously described. The solenoid 85 when energized operates to press disc 91 into contact with disc 89 by lever 92 pivoting on a support on frame member 93 against tension spring 84.

The synchronous motor 86 is driven by a rotary field the frequency of which determines its speed and thereby the line length for retyping.

The required frequency is to be inversely proportional to the number of characters and character spacings in a line. Hence, as one character is read out per drum revolution, if a 70 cycle per drum revolution generator is connected to the motor for a 60 character line and conversely a 60 cycle generator for a 70 character line, 4,200 cycles will be performed for either line thus producing a constant line length, determined mechanically by the worm reduction gear of the carriage drive. With whole number differences of 1 cycle for each of ten generators for lines between 60 and 70 a similar justification is produced with an error not greater than 5% of the line length. With longer line lengths, for example, between 90 and 100 characters, this error is even smaller.

Figure 18:
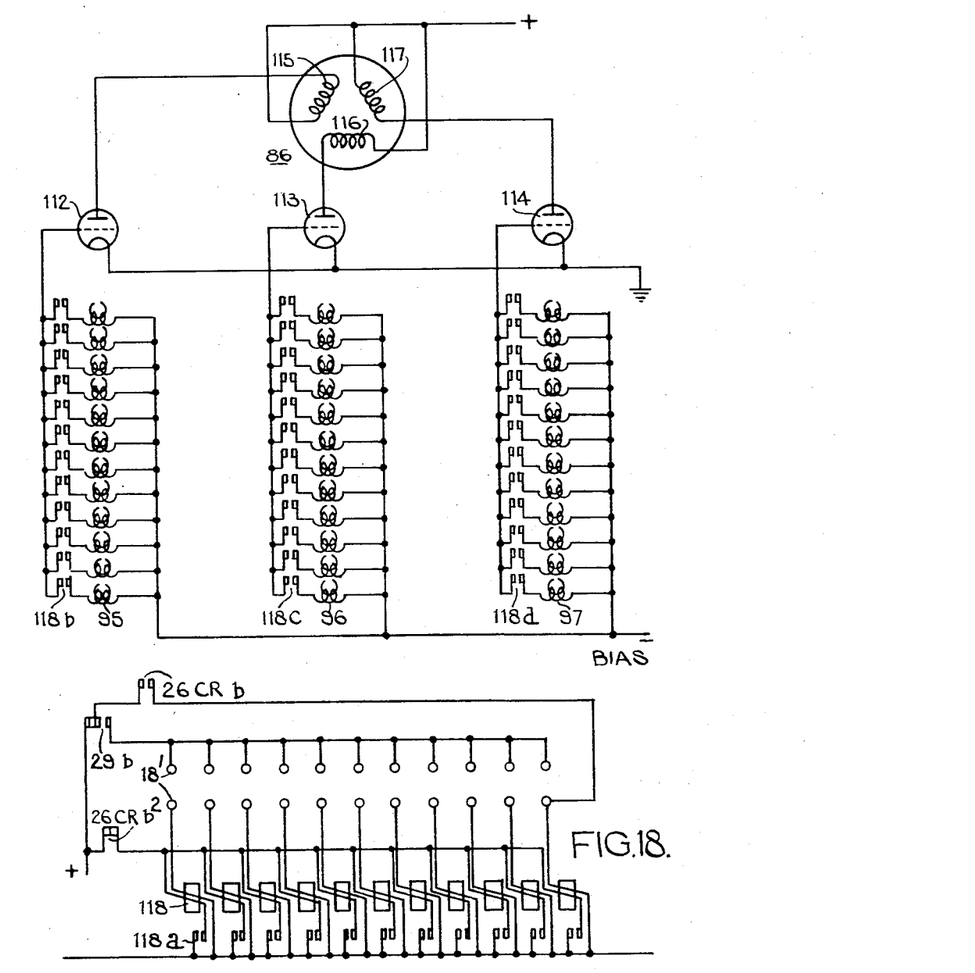
Figure 18 is a schematic circuit diagram of an embodiment of the circuit of the frequency drive selection to the motor of Figure 17 to regulate escapement rate.

The means to produce such cycles is shown in Figs. 7, 11, and 18.

For the ten different line lengths over the standard of 60 there are eleven gear wheels 100—110 of inductive material such as iron having conveniently 60, 61, 62, etc. to 70 teeth, respectively. For each gear wheel there are provided three magnets 95, 96 and 97 carrying windings so that voltages are induced each time a magnet is traversed by a tooth. These magnets are supported on three cross bars 98, 99 and 111 fixed to the support members 68 (Figs. 7 and 11). These magnets may be permanent magnets or may be magnetized by a bias winding (not shown). The magnets 95, 96, 97 are positioned to produce three phases for operating the synchronous motor 86 (Fig. 17). Each of the magnets 95 is respectively connected via one of the switches 118b to the grid of an amplifier 112 having one phase winding 115 of the motor 86 in its anode circuit.

Likewise, heads 96 are respectively connected by the switches 118c to the grid of amplifier tube 113 having a second phase winding 116 of the motor 86 in its anode circuit, and heads 97 are likewise respectively connected by the switches 118d to the grid of amplifier tube 114 having the third phase winding 117 of the motor in its anode circuit.

The switches 118b, 118c and 118d are contacts of relays 118 located on the base member 70. One relay 118 selects by closing its contacts b, c, d the three heads associated with one gear. Each relay 118 also has a hold winding adapted to hold the relay on by its own contact 118a. One relay 118 is connected from the plus line via normally closed contact 29b and normally open contact 26CRb (a contact closed by manual operation of the carriage return key of the first typewriter when ending paragraphs) to effect selection of a present motor speed for short lines. Another circuit from the plus line is provided via a normally open contact 29b of relay 29 (Fig. 5) closed by the automatic energization of solenoid 30 of the carriage return at the end of a line of the first typing, to a series of contacts 18¹ and so via a relay 118 associated with each contact 18¹ to ground.

These contacts 18¹ are closed in turn as the carriage of the initial typewriter advances beyond the standard length position so energizing that relay 118 associated with that position at the moment carriage return contact 29b is operated. The particular selected relay 118 then holds on by a hold winding and its own contact 118a and normally closed contact 26CRb². In this manner a particular relay 118 is selected for selecting a particular set of three magnetic heads 95, 96, 97 of a generator wheel to provide the appropriate justifying frequency for the synchronous motor 86 and this frequency is maintained until the normally closed contact 26CRb² (which is in circuit with all the hold windings of relays 118) opens as a result of the energization of the carriage return solenoid 30CR² of the justifying typewriter at the end of any line moving its associated key and hence operating carriage return contact 26CRb². If no automatic carriage return has occurred (i.e. relay 29 not operated) and the line is finished by a manual carriage return then a standard spacing as used for the "70" character line is selected in the absence of any contact 18¹ being closed. The particular circuit is traced from positive line, normally closed contact 29b, and carriage return key contact 26CRb to relay 118 associated with the "70 character" frequency generator. In the case of short lines representing paragraph ends the operator pauses before operating the carriage return key to allow completion of the automatic typing of the preceding line.

Figure 19:
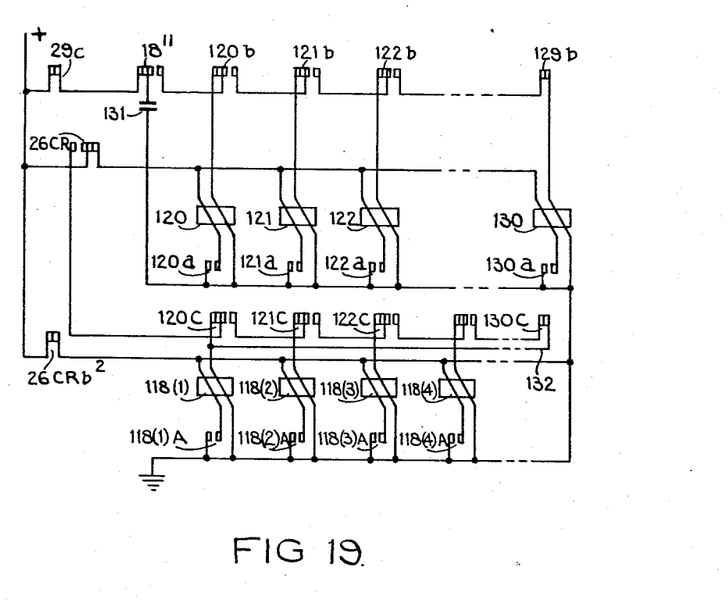
Figure 19 is a schematic circuit diagram of an embodiment of an alternative to Figure 18 in which a counter is employed to control the frequency selection.

In an alternative form the standard line contact 18 is modified for on and off contacts and referenced 18¹¹ alone is provided and the further contacts 18¹ for excess line positions removed and tabs are inserted instead in each excess line carriage position. Thus, contact 18¹¹ is operated at the standard length and for each spacing operation thereafter by the successive tabs and the number of times this contact 18¹¹ is operated is entered into a counter which controls the relays 118. This modification is shown in Fig. 19 modifying the lower part of Fig. 18; similar parts being referenced as before. During the typing by the first typewriter within the standard line length the now modified double contact 18¹¹ connects the positive line via normally closed contacts 29c of relay 29 (Fig. 5) to charge capacitor 131. Upon reaching the standard line length contact 18¹¹ opens its closed contact and closes its normally open contact under the control of the stop 23 to provide a setting impulse to energize the relay chain counter 120—130; said relay chain counter being a form of counter known per se.

The first impulse energizes the first stage relay 120. The relay 120 holds on by a circuit traced from its own contact 120a, hold winding and normally closed contact 26CR.

The next impulse is diverted by now closed contact 120b to relay 121. Each counter stage is analogously connected in turn for each further impulse.

Upon carriage return being caused automatically relay 29 is operated (Fig. 5) and opens its normally closed contact 29c thereby preventing any change of count during carriage return. If this standard length position had not been reached then the operation of carriage return would not result in the tabs operating contact 18[11] and so would not produce further impulses to affect the stored count.

Operation of the carriage return solenoid results in the making side of the now modified contact (make before break) 26CR operating that selection relay 118 selected by contacts 129c to 130c according to the operated counter stages. The counting relays hold circuit is in the breaking side of 26CR and thus resets the count relays in preparation for the next line immediately after selection of the frequency selecting relay 118(1). With no counter stage operated, relay 118(1) is selected. With a count of "1," i.e. relay 120 operated, selection relay 118(2) is selected and so on. The operated selection relay then holds on via its own contact 118(A) hold winding and normally closed contact 26CR$b^2$. Upon completion of typing by the justifying typewriter under control of the selected frequency, carriage return contact 26CR$b^2$ is automatically operated releasing the operated selection relay. Relay 118(1) is operated in absence of any count, that is, for paragraph endings, and this may conveniently select the same frequency as the longest line (pulse generator with 60 teeth). Relay 118(1) is connected to this position by line 132 for operation by contact 130c on the longest line. Relay 118(2) is operated for a count of "1," i.e. standard line length, and hence selects the highest frequency generator (70 teeth) and relay 118(3) one cycle less. The other relays are similarly associated with the other frequency generators.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus to record a justified line from data recorded magnetically comprising a typing means having at least one control contact related to standard line length, a rotatable magnetizable member, means operatively connected with said typing means and with said magnetizable member for recording thereon information typed on said typing means, a character-by-character printing means, means to read out said recorded information and for accordingly operating said printing means, a plurality of frequency generating means for producing a plurality of different frequencies, respectively, and means under control of said control contact to select from said frequencies, for the proper spacing of the characters printed by said printing means, one frequency for lines of standard length and proportionately different frequencies appropriate for each excess character present in any line, said printing means including spacing means for producing different spacing of said characters in response to a respectively selected frequency applied to said spacing means.

2. Apparatus as claimed in claim 1 in which the means under control of said control contact includes a counter for counting the number of said excess characters.

3. Apparatus as claimed in claim 1 in which a plurality of control contacts is employed, one for each excess character present in a line, each control contact being connected to control the selection of an appropriate frequency.

4. Apparatus as claimed in claim 1 including a distributor means for effecting the read-out of said magnetically recorded data at the rate of one character per revolution of said magnetizable member, said frequency generators being connected for operation in synchronism with each such revolution during reading out.

5. Apparatus as claimed in claim 4 including a motor supplied by a selected one of said frequencies for effecting a continuous advance of the printing position in said printing means and a spacing of said characters depending on the particular selected frequency supplied to said motor for the printing of a particular line.

6. Justifying apparatus having first and second printing means including character spacing means, and magnetic rotatable storage means, means to record characters keyed on said first printing means in code form signals on said storage means, means to sense said signals recorded on said storage means, distributive means connected to said sensing means, decoding means connected to operate said second printing means, said distributive means being connected for delivery of said sensed signals to said decoding means, a plurality of frequency generators for producing respectively different frequencies and means to select a desired frequency generator producing a selected frequency to control the operation of said spacing means in said second printing means during printing of a line, the amount of spacing depending on a selected frequency, said selecting means including a standard line length contact and a space key on said first printing means cooperating for effecting the selection of a frequency, and line terminating means in said first printing means for controlling the initiation of the read-out of a completed recorded line so as to operate said second printing means to effect printing of said line at a rate of one character per magnetic storage means revolution and in a constant printed length.

7. Justifying apparatus as claimed in claim 6, in which said means for selecting a desired frequency generator are connected so as to select the highest available frequency for printing lines which in said first printing means did not result in operation of said standard line length contact.

8. In combination, a signal storage device, a typewriting, printing or like key operated mechanism having means actuated by the depression of said keys for causing the recording of signals corresponding to said keys, respectively, in said signal storage device, means for sensing said recorded signals, a second typing, printing or like mechanism, means for operating said second mechanism depending on said sensed signals, the sensing of signals for one line to be printed in said second mechanism taking place during said actuation of the keys for the next line in said first mechanism, means for counting in each line the number of key depressions between the end of a standard line length and the first actuation of a selected key after the reaching of such length, and means in dependence on the result of said counting in each line for varying the rate of reproduction of that line in said second mechanism, to effect typing, printing or the like in lines of uniform length.

9. In an arrangement as claimed in claim 8, a rotating field driving means in said second mechanism, signal generator means for producing a plurality of different frequencies, and means for supplying to said driving means a selected frequency from said plurality of different frequencies obtained from said signal generating means.

10. An arrangement according to claim 9, wherein said signal storage device is a rotating means, and said signal generating means comprises a series of rotary pulse generators arranged to rotate with said storage device, each of said generators having a different pulse frequency generation from the others, means operated by said generators in accordance with said pulse frequencies for determining proportionately the rate of operation of said second mechanism, and means operating in dependence on the difference between the line length determined by the result of said counting and the length to which the line must be justified, for selecting a pulse generator to drive said mechanism at a rate that will give a predetermined uniform line length.

11. Justifying apparatus comprising a first data printing means for printing data lines character by character, storage means controlled by said first data printing means for recording said data lines, second printing means controlled by said storage means for printing said data lines, said first data printing means having a standard line length contact operable at a standard line length position in a line of the said first data printing means, counting means connected to count only each character position in said line in excess of said standard length position, and means controlled by said counting means to effect recording of said recorded data lines by said second printing means in lines of constant length.

References Cited in the file of this patent

UNITED STATES PATENTS

| | | |
|---|---|---|
| 2,379,862 | Bush | July 10, 1945 |
| 2,609,907 | Lynch | Sept. 9, 1952 |